(12) United States Patent
Bird

(10) Patent No.: US 6,321,235 B1
(45) Date of Patent: *Nov. 20, 2001

(54) GLOBAL CACHING AND SHARING OF SQL STATEMENTS IN A HETEROGENEOUS APPLICATION ENVIRONMENT

(75) Inventor: Paul M. Bird, Toronto (CA)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/162,164

(22) Filed: Sep. 29, 1998

(51) Int. Cl.[7] .................................................. G06F 17/30
(52) U.S. Cl. ................................. 707/203; 707/2; 707/4
(58) Field of Search ............................... 707/8, 2, 4, 203; 709/203

(56) References Cited

U.S. PATENT DOCUMENTS

| | | | |
|---|---|---|---|
| 5,136,707 | 8/1992 | Block et al. | 707/201 |
| 5,283,894 | 2/1994 | Deran | 707/1 |
| 5,544,345 | 8/1996 | Carpenter et al. | 711/150 |
| 5,559,984 | 9/1996 | Nakano et al. | 711/121 |
| 5,848,241 | 12/1998 | Misinai et al. | 709/213 |
| 5,897,634 | * 4/1999 | Attaluri et al. | 707/8 |
| 5,924,096 | 7/1999 | Draper et al. | 707/10 |
| 5,974,129 | 10/1999 | Bodnar | 379/207 |
| 5,987,499 | * 11/1999 | Morris et al. | 709/203 |
| 6,021,413 | * 1/2000 | Vaduvur et al. | 707/201 |
| 6,073,129 | 6/2000 | Levine et al. | 707/4 |
| 6,098,064 | * 8/2000 | Pirolli et al. | 707/2 |
| 6,115,703 | 9/2000 | Bireley et al. | 707/2 |
| 6,233,584 | * 5/2001 | Purcell | 707/103 |
| 6,237,000 | * 5/2001 | Dahlen et al. | 707/100 |
| 6,243,719 | 6/2001 | Ikuta et al. | 707/204 |

OTHER PUBLICATIONS

Attaluri et al., "Concurrency Control of Large Unstructured Data," IEEE, 1988, pp. 314–323.*

Thomas et al., "Heterogenous Distributed Database Systems for Production Use," ACM Computing Surveys, v. 22, No. 3, Sep. 1990, pp. 237–266.*

* cited by examiner

Primary Examiner—Thomas Black
Assistant Examiner—Charles L. Rones
(74) Attorney, Agent, or Firm—Prentiss W. Johnson; Daniel E. Johnson

(57) ABSTRACT

A global cache for SQL sections and methods of accessing the cache. The global cache being at the database level and being accessible to all agents of all applications. The global cache having a static and a dynamic portion. The static portion containing section entries having both section information and section data. The dynamic portion having two sub-portions, a statement portion and a dependency portion. The dependency portion containing multiple SQL statements, multiple compilation environments for each SQL statement and multiple variations within each compilation environment. The dependency portion of the dynamic portion containing a plurality of lists of object types. Each object type having its own list, the list containing data on which variations are dependant on each object.

22 Claims, 6 Drawing Sheets

GLOBAL CACHING AND SHARING OF SQL STATEMENTS IN A HETEROGENEOUS APPLICATION ENVIRONMENT

FIELD OF THE INVENTION

This invention relates to relational database management systems and more particularly to a method of caching dynamic and static SQL statements so that these statements having been prepared once may be reused by multiple requesters.

BACKGROUND OF THE INVENTION

Structured Query Language (SQLd is the database access language most commonly used to access relational databases (such as the DB2 product sold by IBM Canada Ltd.) in an open, heterogeneous environment. Although this disclosure refers to the DB2 relational database product sold by IBM, individuals skilled in the art will recognize that the caching of database access statements is applicable to any relational database management system (RDBMS).

Within this specification including the claims, the following terms will be used:

Access Plan An access plan is the method(s) chosen by the SQL Compiler to satisfy an application request as stated in the form of an SQL statement.

Agent A process used by a RDBMS to provide services for an application request.

Node A node is a physical entity (eg. a processor and memory) that is used to process application requests to the RDBMS and contains some or all of the database. A serial version of the RDBMS contains at most 1 node, while a parallel version of the RDBMS can contain 1 or more nodes.

Package A package is associated with an application and contains the information required by the RDBMS for all SQL statements defined in that application. The information in a package consists of a collection of sections and the compilation environment settings (e.g. compile or binding options) used to compile any static SQL statements; some of these same settings are also used as the default environment for any dynamic SQL statements compiled by the application during execution.

Section A section contains all the information required by the RDBMS to execute the chosen access plan for an SQL statement. A section is the compiled version of the access plan chosen by the SQL compiler.

Section Entry A section entry contains information about a specific section as well as the SQL statement corresponding to that section.

There are two basic types of SQL statements, static and dynamic. In using static SQL the user embeds SQL requests for data in an application program. An SQL precompiler removes these statements from the application program and replaces them with function calls whose parameters indicate a specific section entry for the package corresponding to the current source file. The removed SQL statement is then sent to DB2 for compilation. Compiling (also known as preparing) a SQL statement is the process by which the DB2 SQL compiler chooses and builds an access plan to efficiently resolve the SQL statement. The access plan is saved in its executable format, a section, in the system catalogues.

The parsing of the statement and building of the access plan can be relatively long and complicated. Compilation of static SQL improves run time performance by building the access plan before the application is executed.

Dynamic SQL is generally used for ad hoc SQL requests. For example, in a database used to track sales of individual products, a dynamic SQL query may be invoked to list the top ten products sold, by sales region. Depending upon the nature of a dynamic SQL request, the time required to parse it and create an access plan to satisfy the user request can be significant. Further, if the dynamic SQL request is repeated later in the application by the same agent or perhaps by a different agent, a new access plan must be created in each instance. Thus, the creation of an identical access plan may often have to be repeated, thereby impacting performance of the application.

Solutions to improve application performance include the concept of caching all the information necessary for an agent to invoke an access plan.

IBM Technical Disclosure Bulletin volume 39 No. Feb. 2, 1996 pages 113–116 discloses a caching scenario within a client/server environment which applies to a applications running on a single client and using a single interface (the one providing the cache). The present invention is a server cache available to all application requests regardless of interface or client.

IBM Technical Disclosure Bulletin volume 39 No. Feb. 2, 1996 page 179 discusses the concept of caching dynamic SQL statements. This one page synopsis of the idea does not address the issue of multiple applications with multiple agents being able to share the cached SQL statement IBM Technical Disclosure Bulletin volume 39 No. Feb. 2, 1996 at pages 235–236 discloses a concept known in the art as "extended dynamic SQL". Extended dynamic SQL is a method which allows users to specify that dynamic SQL statements relating to a specific package be "captured" and stored in the system catalogues, in effect converting the statements to static SQL. There is no concept of sharing these statements beyond the package with which they are associated. As users of the same package may not be aware that a dynamic SQL statement has been "captured", program logic is required to detect multiple prepare attempts for the same statement and to map it to an existing "captured" statement. Such a scenario requires the user to pro-actively register their queries as well as requiring that all such queries be persistent, i.e. are permanently stored within the database.

In the prior art caching solutions described above, there is no facility to allow agents of multiple applications to access and execute common sections. Thus, there is a need for such a facility.

SUMMARY OF THE INVENTION

The invention comprises a global cache for SQL section in a relational database management system, the global cache being stored in a computer readable memory and being accessible to a plurality of agents, the cache having a static SQL portion and a dynamic SQL portion. The dynamic SQL portion having a statement portion and a dependency portion. The statement portion containing one or more SQL text statements, one or more compilation environments, and one or more variations within the compilation environments. The dependency portion of the global cache having lists of objects each of the lists being specific to a single object type, each object in the list containing information on variations that are dependant on the object.

A relational database management system having a plurality of interlinked heterogeneous nodes each of the nodes having associated storage and processor resources. Each node including a global cache, the cache having a number of SQL sections, means for locating the sections and means for creating new variations in the cache.

BRIEF DESCRIPTION OF THE DRAWINGS

Reference will now be made, by way of example, to the accompanying drawings which show a preferred embodiment of the present invention and in which.

DETAILED DESCRIPTION OF THE PREFERRED EMBODIMENT

Figure 1:
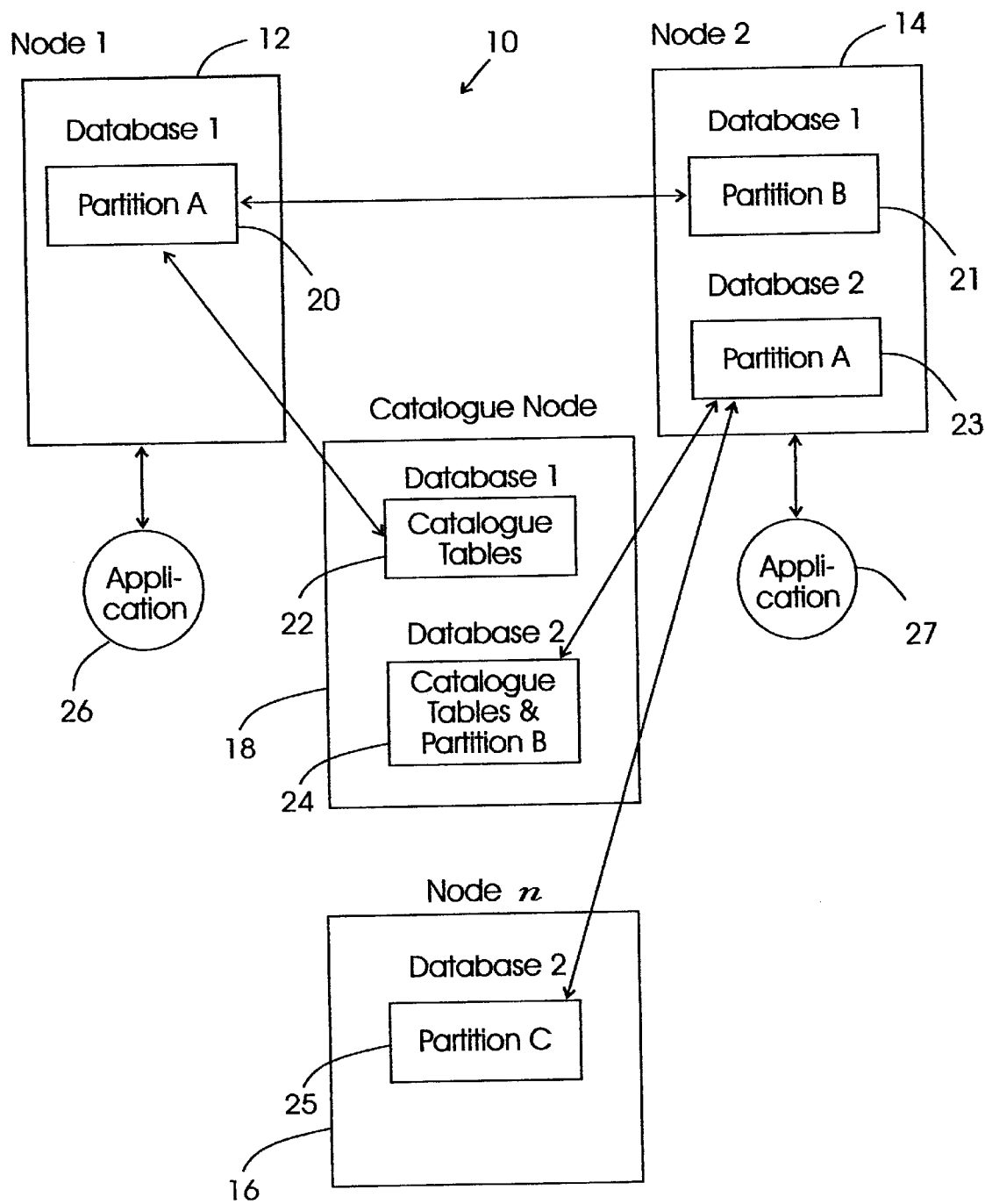
FIG. 1 is a conceptual diagram of a Relational Database Management System.

FIG. 1 is a conceptual diagram of a Relational Database Management System (RDBMS) 10. The RDBMS 10 of FIG. 1 illustrates only one of many configurations available in an RDBMS and is intended only to show a networked system that may utilize the present invention. In the configuration as shown, RDBMS 10 contains a plurality of nodes (12, 14, 16, 18). Each node (12, 14, 16, 18) may contain a partition or all of a database. In the example of FIG. 1, the RDBMS has two databases, although any number of databases can be provided, the content of which is partitioned among the plurality of nodes. The first of these databases is divided into a partition 20 and a partition 21. The catalogue 22 for his first database is stored on catalogue node 18. The catalogue tables 22 contain all the "meta-data" such as the structure, packages and functions relating to the first database. The second database is divided into partitions 23, 24 and 25. Note that in the illustrated example, the partition 24 of the second database also contains the analogue tables for the second database. Thus, a catalogue node 18 may contain data as well as catalogue tables. Catalogue tables are per database and can be located at different nodes for different databases. This means that the term "catalogue node" is relative per database, i.e. the catalogue could reside on any node.

Figure 2:
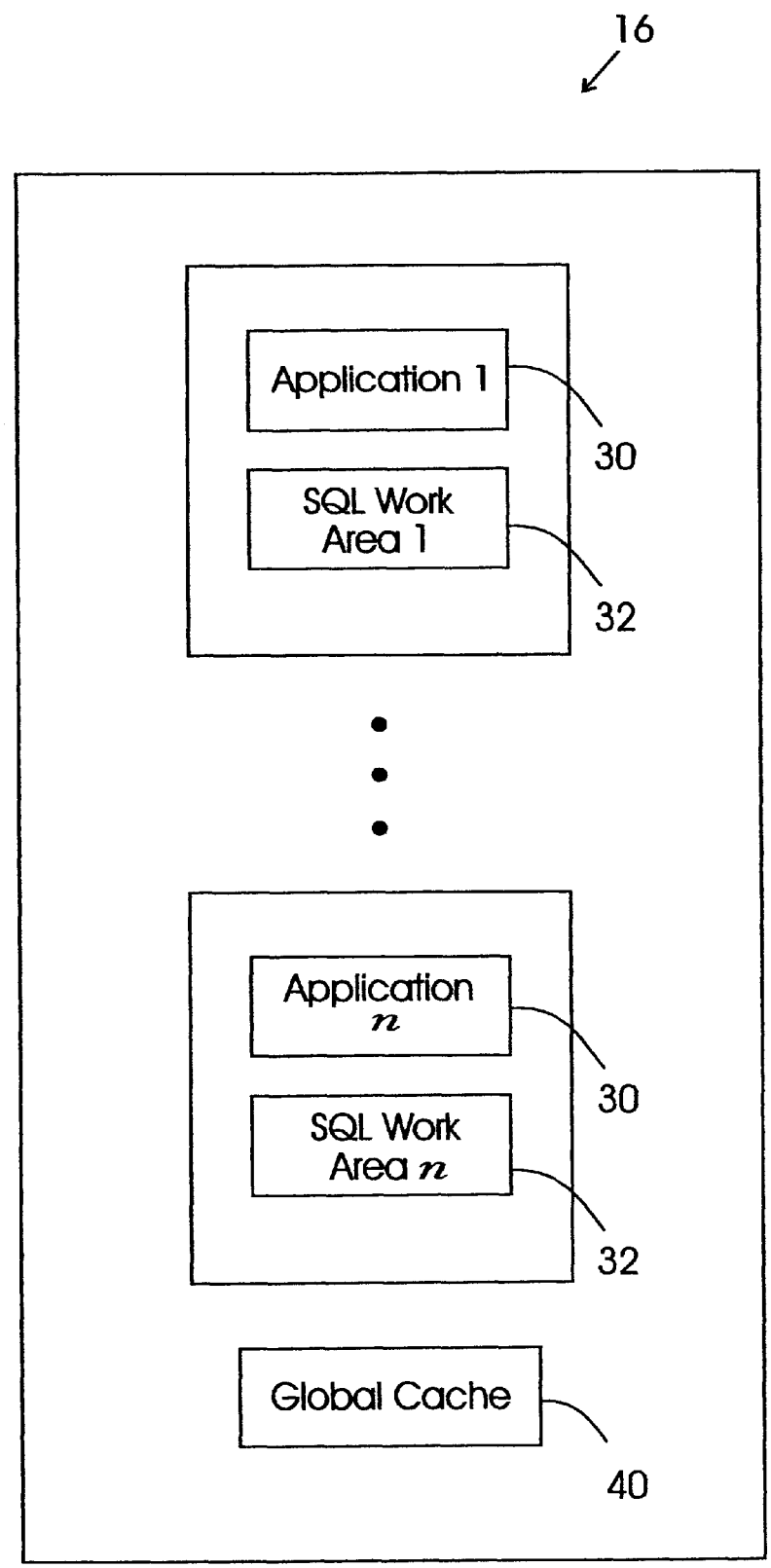
FIG. 2 is a conceptual diagram of a node of the Relational Database Management System of FIG. 1 utilizing the global cache of the present invention.

FIG. 2 illustrates one scenario of the activity that may occur on any node of the system and, by way of example, the node 16 of the RDBMS system 10 of FIG. 1 is shown. Node 16 may contain any number of applications 30, each accessing data from the database(s) to which the node is connected. Each application 30 has a respective SQL work area 32. Also contained within node 16 is a global cache 40 in accordance with the present invention.

The global cache 40 acts as a repository for package and section information for static SQL and statement and section information for dynamic SQL as detailed below.

The following discussion applies to any RDBMS supporting SQL. The RDBMS DB2 is used by way of example. All SQL requests to DB2 are directly associated with a specific section entry within a specific package. Packages and section entries are stored in catalogue tables accessible by all applications. For static SQL, as the sections are created at compile time, they are stored in the catalogues. Catalogue tables are a set of relational tables in which all of the meta-data about the database (and the objects within it) is kept. The tables related to packages and static SQL are SYSPLAN (information on package and section entries), SYSSECTION (sections for static SQL), SYSSTMT (statement text for static SQL), SYSPLANDEP (package dependencies) and SYSPLANAUTH (package privileges).

For dynamic SQL statements, no rows are stored in a catalogue table since the statement is not known until the application using the package is executed. The section entry for a dynamic SQL statement acts as a "bookmark", and does not contain a section until a dynamic SQL statement is prepared for that section entry. By virtue of being dynamic, the content of the statement text will not be known until run time. The dynamic SQL section entry does, however, by virtue of its inclusion in a package, provide context information on the compilation environment for the dynamic section entry.

In prior versions of "package cache" used by DB2, the package cache was a private memory allocation for each agent Each agent needed to read in the information from the catalogue tables for each unique package and static SQL statement executed by that agent. For dynamic SQL, each agent needed to compile a statement if a section for that statement did not already exist at the specified section entry of the specified package; this was done even if the agent had already encountered this same statement in a different section entry or package. By way of example, application VOILA has two packages that it uses, Package A and Package B, assume that each package results in the same compilation environment:

Package A
  Section Entry 1 has SELECT C1 from T1 (dynamic)
  Section Entry 2 has SELECT C1 from T1 (dynamic)
Package B
  Section Entry 1 has SELECT C1 from T1 (dynamic)

In prior versions of the package cache, three separate compiles would have be done since the dynamic requests would be mapped to a specific section entry within a specific package. In the present invention, each request would visit the global cache where there would be only one entry for SELECT C1 FROM T1 and thus only one compile.

In prior versions of the package cache, the cache was created when the agent was initialized, and was destroyed when the agent was terminated or swapped to work for another application.

The Global Cache

In the preferred embodiment, the global cache is kept at the database level, and is accessible to all agents for a database at a particular node of the database (physical or logical). It is allocated from the same memory set as other database-level entities, such as the lock list or buffer pool; it is created when the database is initialized, and it remains active until the database is shut down. The global cache acts like a "public" library for all the agents using the database at a given node. Agents simply copy the package information and the modifiable portions of the sections (e.g. buffers and flags) to their own memory, and then execute the section. Package information and static SQL information are loaded into the global cache from the catalogue tables by the first agent to require them, and thereafter remain available to any other agent requiring them without the need to access any catalogue tables. Since the static SQL cache is a shadow of the database catalogues, any actions affecting the information in the catalogues also affects the information in the cache. Thus, if a package needs to be marked as invalid in the catalogue, it must first be marked invalid in the static SQL cache. For example, an event or statement that alters the structure of a table in the database can cause a package to become invalidated and flushed from the cache.

If an affected package is in use at the time of the invalidating event's occurrence, then the event must wait until it cam acquire control of the affected package. In some scenarios, this may result in the event being rolled back due to lock timeout or deadlock detection. An invalidated package is flushed from the cache and must be reloaded into the cache by the next requester. Dynamic SQL statements are loaded into the global package cache by the first agent to compile them, and then remain available to any other agent that needs a section for the exact same statement and the same compilation environment.

Figure 3:
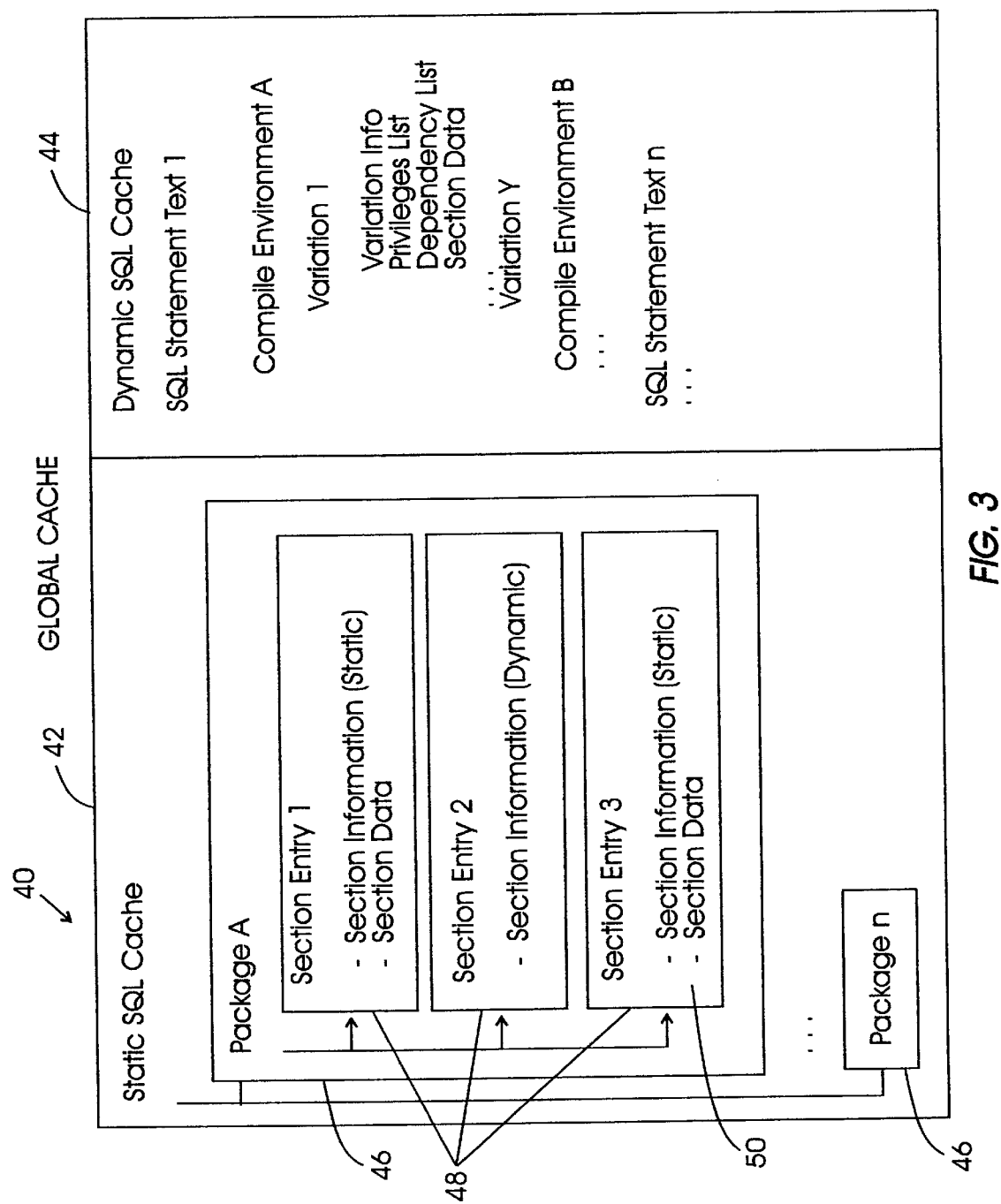
FIG. 3 is a conceptual diagram of the global cache.

Referring to FIG. 3, the global cache 40, consists of two logical areas: the static SQL cache 42 and the dynamic SQL cache 44. The static cache 42 contains the information for packages 46, section entries 48, and static SQL sections 50. The structure of the static SQL cache 42 is based on the unique nature of each qualified package name. Within each unique package 46, the information is structured such that a section entry 48 associated with a specific package 46 has a specific ordinal number given to it indicating its location within the package 46. This number, referred to as the section number, is assigned during the precompilation phase of package creation, and is assigned in the order in which SQL statements requiring unique section entries 48 are encountered in the source file by the precompiler.

The dynamic SQL cache 44 contains the information and sections for dynamic SQL statements. The description of the structure of the dynamic SQL cache 44 is provided in the description of FIGS. 5 and 6 hereinbelow.

Figure 4:
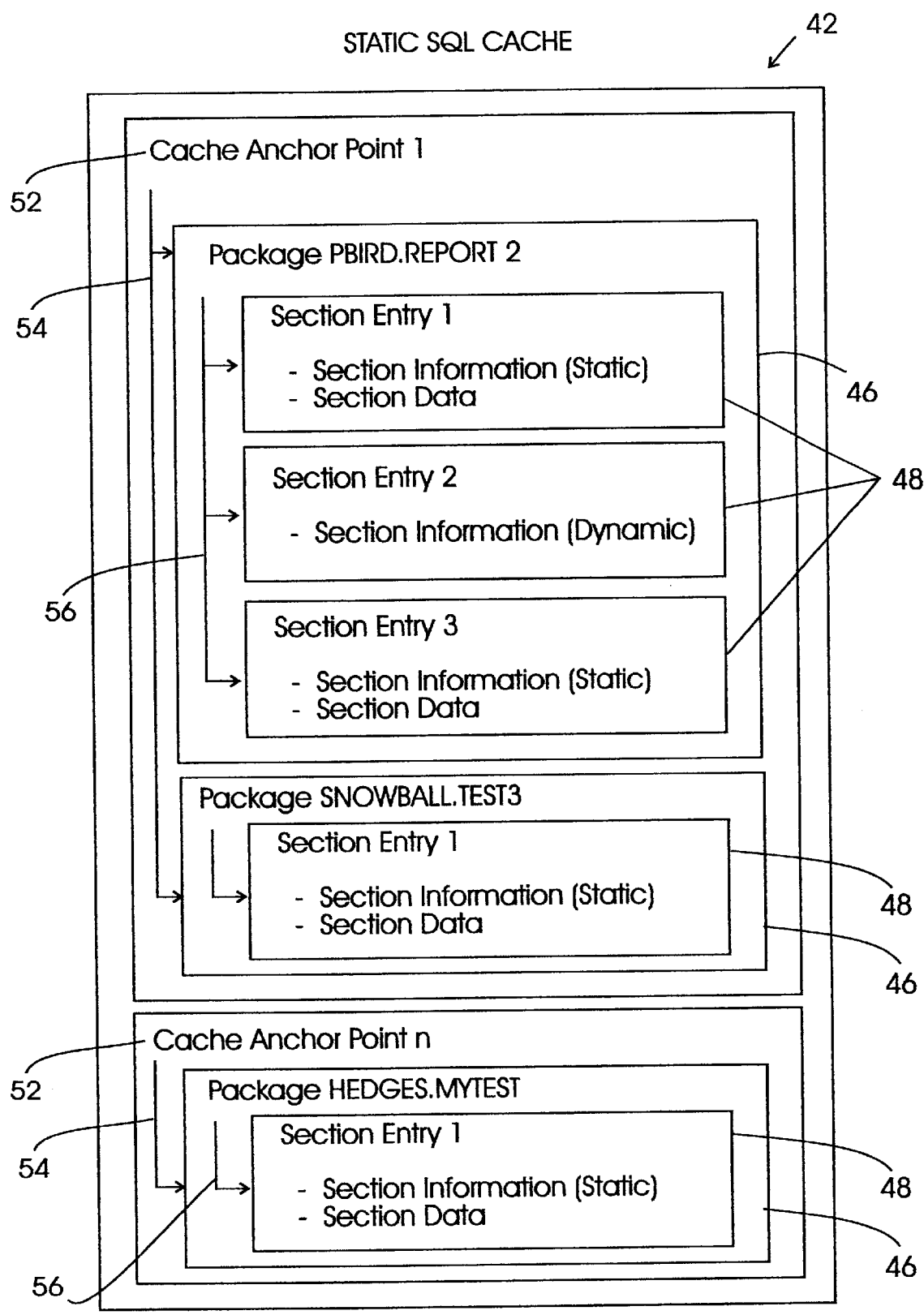
FIG. 4 is a conceptual diagram of the static cache portion of the global cache.

Referring now to FIG. 4, package 46 and section entry information 48 will be loaded into the static SQL cache 42 from the system catalogues as required in response to either a dynamic or static SQL request from an application. Static SQL requests will be satisfied from the static SQL cache 42 while dynamic SQL requests will be routed to the dynamic SQL cache 44 once the package 46 and section entry 48 information have been obtained from the static SQL cache 42. Note that requests can go directly to the dynamic SQL cache 44 if the package 46 and section entry 48 information are already known by the requester.

The common unit in the static SQL cache 42 is the section entry 48. Each section entry 48 is associated with one, and only one, package 46. The package 46 can have multiple section entries 48 associated with it. Each package 46 in the static SQL cache 42 is distinct and only one copy of any package 46 may appear in the static SQL cache 42 at one time. To facilitate access, each package 46 is associated with a specific static cache anchor point 52 by hashing the fully qualified name of the package 46 into a unique static anchor point 52. Once associated with an anchor point 52, the package 46 is inserted into the list of packages 54 from the static anchor point 52 in alphabetical order, based on package name followed by the package qualifier (i.e. schema). Section entries 48 are associated with the appropriate package name and are inserted into the list of section entries 56 for a package in the numerical order of the section entry 48 numbers.

Internally, the static SQL cache 42 consists of a static SQL cache control block (not shown) which contains a list of cache anchor points 52. Each cache anchor point 52, points to a series of two-dimensional linked lists of package/section information. The first dimension is a linked list of pointers to the packages 54, the second dimension is a linked list of section entries 56 within each package 46. Each linked list of packages 54 hangs from an anchor point 52 and the base for all anchor points is in the control block. The control block also contains summary statistics for the cache as a whole. These statistics are updated whenever an insertion request occurs, or upon request from a database monitor, by reading the individual anchor point statistics and placing them in the control block. When the control block statistics are being updated, an exclusive latch is held on the control block to avoid conflict. This latch does not prevent access to the cached information via the anchor points 52.

Figure 5:
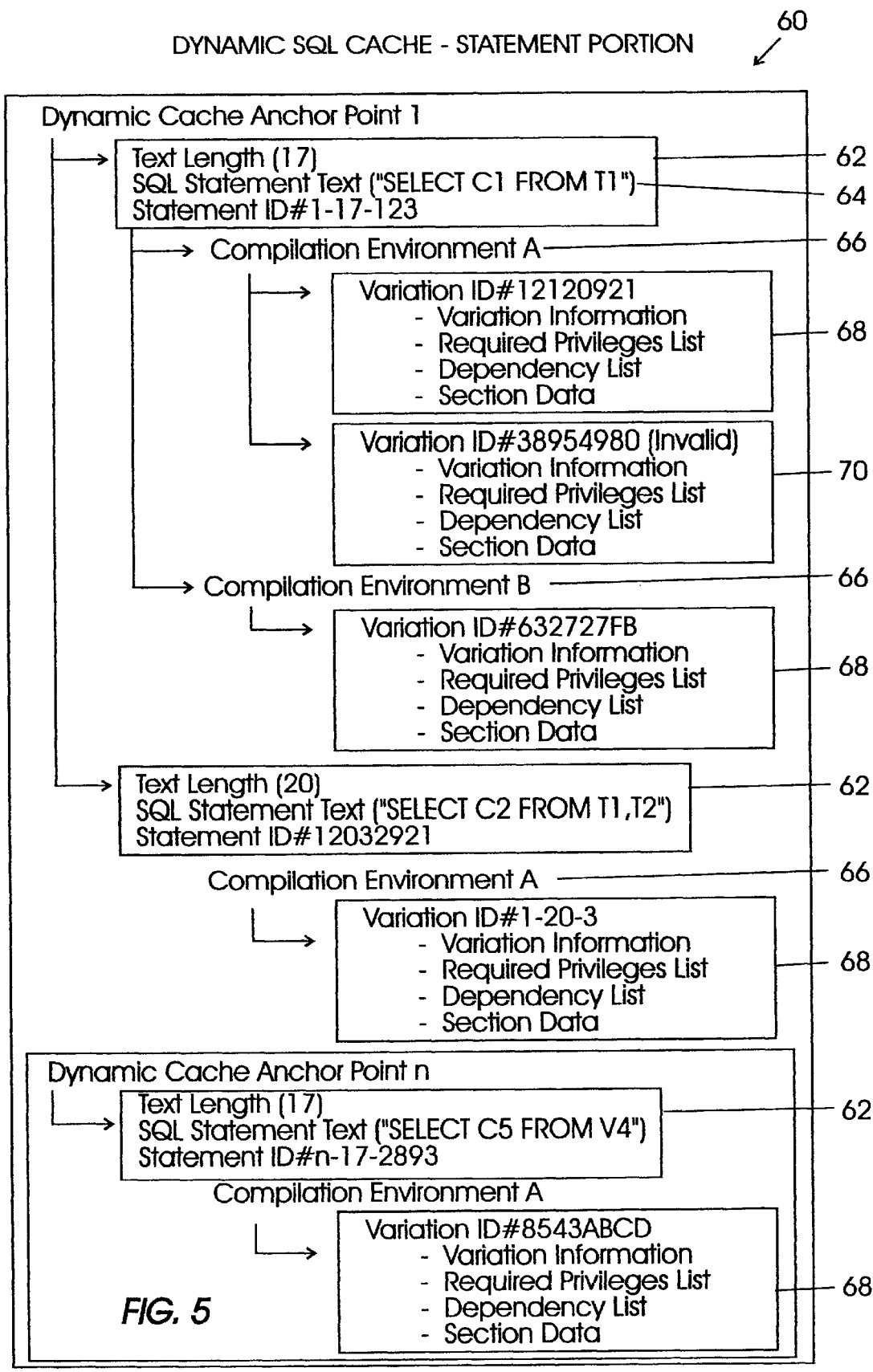
FIG. 5 is a conceptual diagram of the statement portion of the dynamic cache portion of the global cache.
Figure 6:
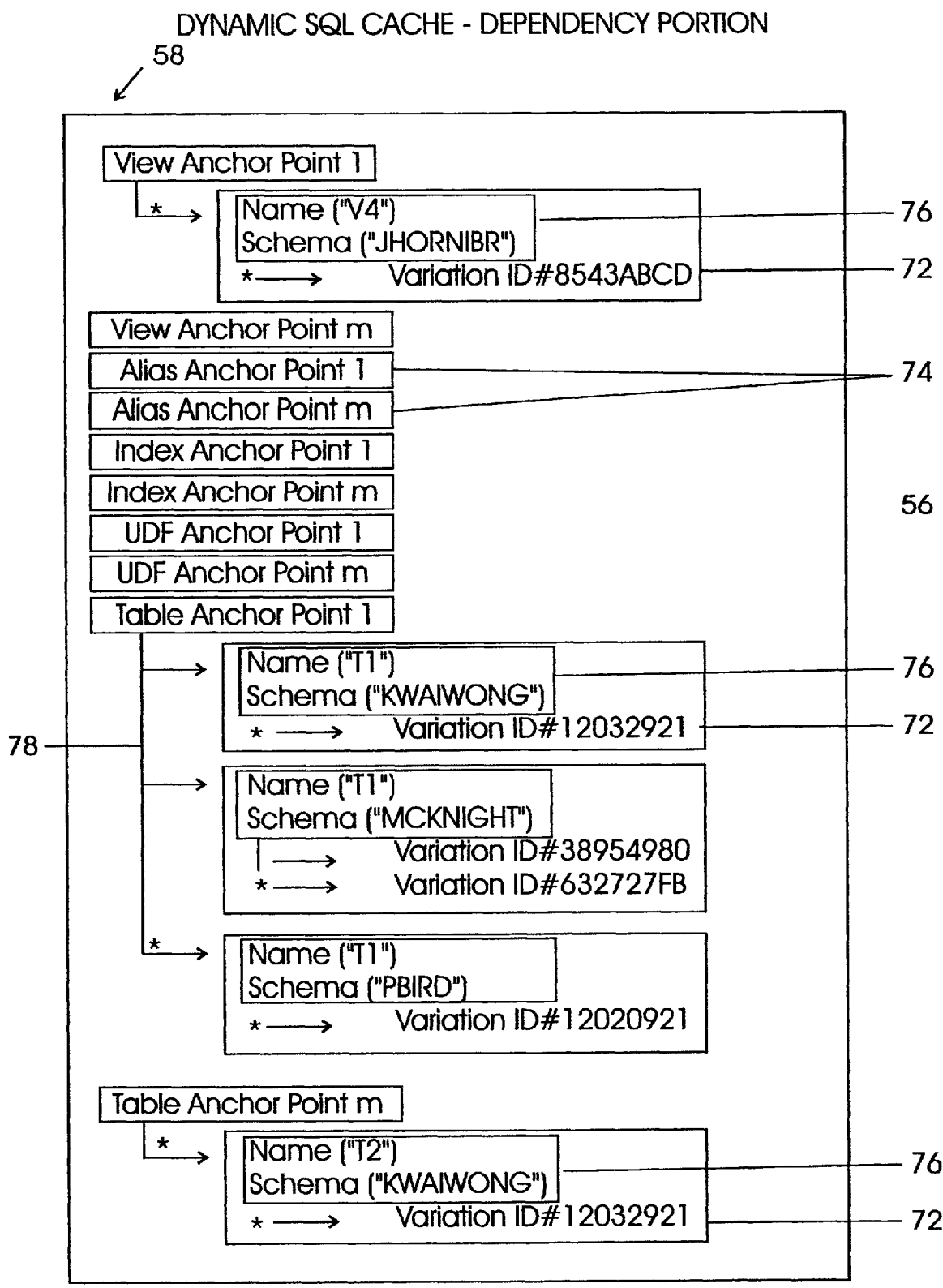
FIG. 6 is a conceptual diagram of the dependency portion of the dynamic cache portion of the global cache.

The dynamic SQL portion 44 of the global cache 40 is subdivided into two portions: the statement portion 60 (FIG. 5) and the dependency portion 58 (FIG. 6). The statement portion 60 contains SQL statement entries 62 which contain the text of the cached dynamic SQL statements 64 as well as the different sections compiled for each SQL statement. The statement portion 60 of the dynamic cache 44 is used to support application requests to prepare the dynamic SQL statement 64 and obtain an executable section. The dependency portion 58 of the dynamic cache 44 contains entries for all the objects upon which the cached dynamic SQL sections are dependent. This information is used to support cached object invalidation due to data definition language statements and other database activities.

Referring now to FIGS. 3 and 5, the primary structure of the dynamic SQL portion 44 of the global cache 40 is based upon the unique text for a given SQL statement 64, which is stored within SQL statement entry 62. An SQL statement entry 62 contains characteristic information about the SQL statement 64 that is determined once the first occurrence of the statement text 64 is compiled. This information is invariant since the statement text 64 is constant and these characteristics are inherent in the statement text 64 itself, independent of the environment in which it was compiled. The characteristic information includes:

a) a default qualifier used flag, which indicates if there is one or more unqualified object references in the statement and thus the default qualifier value will be used; and b) function path used flag, which indicates if there is one or more unqualified function references in the statement and that function resolution will be performed using the function path.

A section generated for the exact identical SQL statement text 64 is stored within the compilation environment 66. The compilation environment 66 contains information on the environment used to generate or compile the section. The compilation environment 66 contains all information not already contained in the catalogue tables, that influence or control an access plan created by the SQL compiler, and thus the section. The following pieces of information are currently contained in the compilation environment 66 of the preferred embodiment:

i) isolation level;
    ii) query optimization level;
    iii) application codepage;
    iv) date/time format;
    v) blocking
    vi) language level
    vii) cursor WITH HOLD flag
    viii) scrollable cursor flag
    ix) buffered insert flag
    x) SQLMATHWARN flag
    xi) degree of intra-partition parallelism
    xii) SQLRULES array
    xiii) refresh age
    xiv) default qualifier
    xv) function path Below each compilation environment 66 are stored individual units known as "variations" 68. A variation 68 represents a unique section for the statement text 64, where the uniqueness is specified by the compilation environment 66 used to generate the section. The compilation environment 66 encompasses all those elements that affect the nature and result or the section generated by the SQL compiler for a dynamic SQL statement (e.g., special registers, relevant package compilation defaults, use of default qualifiers, use of function path, etc.). Note that since privileges do not affect the actual section generated, only whether it is allowed to be executed, the prerequisite privileges for a dynamic SQL statement 64 are irrelevant to the compilation environment 66. In the preferred embodiment, privileges are not part of the compilation environment 66.

A variation 68 is simply the representation of the fact that two applications issuing the same dynamic SQL statement 64 in the same context with the same compilation environment 66 should generate the exact same section, although the results of execution may differ due to actions within the individual units of work. For example, two applications using the same section for SELECT C1 FROM T1 may return different results if the first application has inserted some rows from T1 but not committed its changes. The first application will get the row returned by the section, but the second application may not. The following are some facets of this tautology. All of these facets assume that the statements are issued within the context of the same database and with the same compilation environment.

a) If an SQL statement contained an explicitly qualified object reference (e.g. SELECT C1 FROM PBIRD.T1), then anyone issuing the exact same statement will be referring to the exact same object;

b) If an SQL statement contains an unqualified object reference (e.g. SELECT C1 FROM T1), then anyone issuing the exact same statement with the exact same default qualifier will be referring to the same object;

c) If an SQL statement contains an explicitly qualified function reference (e.g. SELECT MY.FOO(C1) FROM T1), then anyone issuing the exact same statement will use the exact same function, assuming that the current timestamp value is used to resolve the function; and d) If an SQL statement contains an unqualified function reference (e.g. SELECT FOO(C1) FROM T1), then anyone issuing the exact same statement with the exact same value in the CURRENT FUNCTION PATH special register will use the exact same function, assuming that the current timestamp value is used to resolve the function.

In addition to the identifying compilation environment, each variation 68 under a statement entry 62 and compilation environment 66 also contains: the required privileges list of privileges needed to execute the section, the dependency list for the section and the section generated for the specified compilation environment. The dependency list refers to those objects and entities in the catalogue tables required, either directly or indirectly, by the section for a variation 68. The dependency list is also used to determine whether the section is no longer valid when an object on the dependency list is dropped; if the variation 68 is in use at the time, the drop request is rejected. When a section is no longer valid, the variation 68 is becomes an invalid variation 70 and must be regenerated. The dependency list functions in much the same manner as the package dependencies that are recorded for static SQL statements in the SYSCAT.PACKAGEDEP catalogue table of DB2.

To determine invalid sections, the SYSPLANDEP table is scanned to locate packages dependant on the affected object. Any packages located are invalidated. For dynamic SQL, the name of the affected object is hashed to get the appropriate anchor point 74 (only looking at the anchor points 74 for the same object type 72) in the dependency portion 58 of the cache and then the list of dependent objects 78 is scanned for a match. Once a match is located an attempt is made to invalidate the list of dependent variations within the object 72. The major exception is that the loss of privileges does not result in any variation 68 being marked as invalid variation 70 since, as noted previously, privileges do not affect the contents of the section. Since a variation 68 represents a dynamic SQL statement, and dynamic SQL always reflects the current environment, other actions such as issuing the RUNSTATS command against a table or creating a new User Defined Function (UDF) can cause a variation to be marked invalid.

Dynamic SQL always reflects the current environment, i.e. the section for a dynamic SQL statement always represents the choices the SQL compiler would make given the most current environment. This is why a dynamic SQL section is invalidated when a new index is added or statistics are updated. The sections are fine in the sense that they will work, but the environment has changed and the sections may not reflect new choices that the compiler might make. This is not an issue for static SQL, a static SQL statement is frozen in time.

Referring now to FIG. 6, the basic unit of the dependency portion 58 of the dynamic SQL cache 44 is the object 72. An object 72 represents a database object upon which a dynamic SQL variation 68 is dependent. Each object 72 is associated with one or more variations 68. Each object 72 in the dependency Fordon 58 of the global cache 40 is distinct and only one occurrence of the object 72 may appear at any one time. To facilitate access, each object 72 is associated with a specific object type anchor point 74 by hashing the qualified object name 76 to a unique anchor point 74. Once associated with an anchor point 74, the object 72 is inserted into the list of objects 78 off that anchor point 74 in alphabetical order based on the object name 76 followed by the qualifier. Anchor points 74 are type specific (i.e. an Alias anchor point only holds aliases) and only objects 72 of the type represented by the anchor point 74 are to be found off that anchor point 74. In the present embodiment, objects of types: view, alias, index, User Defined Functions (UDP), table, structured types, summary tables, hierarchies and pagesize are supported.

An essential characteristic of a dynamic SQL statement is that it reflects the current database environment and the dynamic SQL cache 44 will not alter this characteristic. If an environment change affects a dynamic SQL section, the variation 68 for that section will be marked invalid making the section an invalid variation 70. Thus, each dynamic SQL statement entry 62 may have one or more compilation environments 66, but each compilation environment 66 may contain only one valid variation 68. An invalid variation 70 will be flushed from the cache during cache space management. For example, an ALTER TABLE statement can cause a variation 68 to become an invalid variation 70 in the dynamic cache 44 and eventually flushed from the dynamic cache 44.

Processing An SOL Statement

The general process followed for an SQL statement issued by an application is fairly straightforward. The following example, while simplifying some of the actual behaviours for the sake of clarity, gives the essential flavour of the processing followed by an agent for any SQL request. All SQL processing for an application takes place in an area known as the SQL work area. Upon receipt of a new request, an agent searches the SQL work area for a matching package to the package identified in the new request. If a matching package is located, the matching package is then searched for a section entry for the section specified in the request. If neither of these searches finds the required information locally in the SQL work area, then the global cache 40 is accessed for the information. If the information is not found in the global cache 40, then the catalogue tables are accessed and the information is loaded into the global cache 40 and into the SQL work area.

Once the package and section entry information have been located, the agent checks to see if the required section has been loaded into the SQL work area. If not, then the global cache 40 is once again referenced. For a static SQL statement, if the required section is not found in the cache 40, then the section is read into the static SQL cache 42 and SQL work area from the catalogue table.

For dynamic SQL, a dynamic section entry 48 or "bookmark" within the active package 46 of the static SQL cache 42 will determine the compilation environment 66 to be used with the text of the dynamic SQL statement 64 for searching the dynamic SQL cache 44.

If a statement 64 with identical text is found within a statement entry 62 of statement portion 60 of the dynamic SQL cache 44, then the compilation environments 66 beneath the statement entry 62 are searched for a match to the current compilation environment.

If a statement 64 with identical text is not found within a statement entry 62 within statement portion 60, then a new statement entry 62 is created, a new compilation environment 66 is inserted below the new statement entry 62 and the SQL compiler is called to create a new variation 68.

The key to be able to share the same variation 68 with any requester using the same dynamic SQL statement 64 lies in being able to accurately determine if the compilation environment 66 of the requester matches one of the compilation environments 66 and thus one of the variations 68 already stored in the cache. Each request to the dynamic SQL cache 44 is accompanied by the complete compilation information for the requester, supplied in the format used by the dynamic SQL cache 44. The processing to determine if a match in compilation environment 66 is as follows:

1) Since the two compilation environments (request and cached) are in a common format, a memory comparison is made of the two, excluding the default qualifier and function path portions. If no match is found, proceed to the next cached compilation environment 66.
2) If the compilation environments match, then
   i) If the statement entry 62 indicates that a default qualifier is used, compare the two default qualifier values. If the values are different, proceed to the next cached compilation environment 66.
   ii) If the statement entry 62 indicates that the function path was used, compare function path length. If different, proceed to the next cached compilation environment 66. If the same, compare the actual function paths. If different, proceed to the next cached compilation environment 66.
   iii) A match is made.

If a matching compilation environment 66 is found, it is then searched for a valid variation 68. If no matching compilation environment 66 is found, then a new compilation environment 66 is immerse under thee statement entry 62 and processing continues as if no valid variation 68 was found.

If no valid variation 68 is found, the SQL Compiler is called, and a new variation 68 is inserted into the statement portion 60 of the dynamic SQL cache 44, under the unique compilation environment 66.

If a valid variation 68 is located, the required privileges list is used to determine if the authorization ID in use for the requesting agent has sufficient privileges or authority to execute the section. Once this has been verified, the section is copied to the SQL work area, and the agent is free to execute the section.

Cache-Protection Consideration

In order to ensure the integrity of the cached objects while they are being used it is necessary to protect them from changes caused by data definition language statements and other such actions. The global cache uses the concept of cache-level locking to ensure protection for a cached object. This concept implies that users of a cached object will acquire a lock on the cached object and no additional locks on system catalogues or other protection will be required. Cache integrity is preserved by the requirement that those agents servicing a request that will affect cache entities must acquire an elusive lock on any affected cached object prior to performing any further processing (with the exception of invalidation of cache variations). If the exclusive lock cannot be acquired, the action is prevented from completing and may be rolled back due to lock timeout or deadlock detection.

Configuring the Package Cache

As is the nature of all caches, the global cache will eventually fill up to its maximum possible size. At his point, space-management logic comes into play whenever a new entry must be added to the global cache. For each new entry into the cache, the amount of remaining memory is checked and, if insufficient memory for the new entry exists, the following procedures are executed (in the order presented) until sufficient memory exists or all options are exhausted:

1) Delete all invalid variations where possible (i.e., the variation is not still in use);
2) Locate and delete static SQL sections and dynamic SQL variations where possible (i.e., if they are not in use at this time), using a Least Recently Used algorithm to elect candidates for deletion; and
3) Delete any package or statement entries that are not being used.

If insufficient memory exists for the new entry, the application will be returned an error. The global cache will continue to accept new attempts to insert entries, since conditions may have changed since the last attempt.

One thing to keep in mind when setting the size of the global cache is that it is a working cache: that is, it must have sufficient memory to hold the sections that are currently being executed. The true caching effect occurs when the size of the global cache is larger than his minimal size. Static SQL sections and dynamic SQL variations that are not in use are left in the cache, and have the potential to speed up performance of future SQL requests by avoiding accessing the catalogue tables or compiling an SQL statement. However, rarely used SQL statements may be stored in the global cache, and the overhead of the memory used to save them may not be worth the indirect costs such as the fact that this memory is not available for a larger buffer pool.

Determining the appropriate size for the global cache is important. If the global cache is too small, performance may be adversely affected by the cost for increased catalogue accesses and the cost for additional SQL compilations. If it is too large, performance may be suboptimal since resources are being taken from other critical areas such as the buffer pool. As always, the proper size depends on the actual workload being run, and only performance tuning can properly determine the optimal set of configuration parameters, including the one for global cache size.

Parallel Database (Multi-Node) Consideration

In a parallel database utilizing the preferred embodiment of the present invention, a database can be divided into a number of different nodes and each node of a database will have its own global cache. In the preferred embodiment when implemented in a parallel database, the global cache for each node is not shared, this lack of sharing is known in the art as a "shared-nothing" approach. Each global cache is independent of each other and no synchronization will be made between caches other than that required for cache protection. For example, when a DDL command such as DROP TABLE occurs, all variations who depend on that table must be locked and invalidated before the physical drop of the table can proceed. This must occur on all nodes since the integrity of a variation (section) accessing that table will be violated once the table is dropped. Protection of cached objects in a parallel database environment will work in the same fashion as it does in the serial database environment: it is the responsibility of the agent servicing a request that will affect cached entities to notify all nodes of any package or dynamic SQL invalidation events. Both static and dynamic SQL events in a parallel environment require that the identical section be executed on all participating nodes. For example, if an application connected to node A issues a new dynamic SQL statement, that SQL statement is complied on node A and the variation and section exist in the cache on node A. When the statement is executed, it may require data from other nodes to be accessed. In order to ensure section integrity and proper coordination, all agents acting on this request for this application on all nodes must in turn use the section from node A, i.e. the identical one used by the coordinator agent. To ensure this behavior the coordinator agent (the agent talking to the application) will ship the section to be executed to each participating node. The participating nodes will load the section into their own global cache and the section will be used by all agents executing in parallel for this application (when requested to by the coordinating agent). In the event of a communication failure occurring at a node, that node will flush both the static and dynamic SQL cache immediately after re-establishing communications and prior to any user request being serviced.

The introduction of a database-level global cache has many benefits. The primary ones are:

1) Only one catalogue table access for each unique package or static SQL section, regardless of the number of agents using that package or section. This behavior will help reduce lock contention on the catalogue tables, as well as improve overall performance through the elimination of redundant access.

2) The ability to share the previous efforts of other applications using the same dynamic SQL statements. This will allow applications to avoid the time required to prepare these statements. The reduction in compilation will also greatly reduce lock contention on the catalogue tables.

3) A reduction in the working memory set required for the database as agents do not need to copy the entire section to the SQL work area, since they can refer to the package cache copy as required.

The present invention also provides media encoded with the executable program code to effect the above described methods.

What is claimed is:

1. A method of operating a relational database management system, said system comprising a plurality of nodes, said method providing a global cache accessible by a plurality of agents, wherein said global cache comprises a portion including a static SQL section and a portion including a dynamic SQL section.

2. The method of claim 1, further comprising locating a section for an SQL statement within said global cache, said locating said section comprising:
   a) locating the package in the static SQL portion corresponding to the package of the current application;
   b) locating a section entry within said package corresponding to the SQL statement to be executed;
   c) executing the section for said section entry if said section entry is for a static SQL statement; and
   d) if the section for said section entry is for a dynamic SQL statement, then locating and executing the variation corresponding to the text of the SQL statement in a statement portion of the dynamic portion.

3. The method of claim 2, further comprising creating new variations in said cache, said creating new variations comprising:
   a) locating the package in the static SQL portion corresponding to the package of the current application;
   b) locating the section entry within said package corresponding to the SQL statement to be executed;
   c) if the section for said section entry is for a dynamic SQL statement, then determining the existence of the SQL statement text, the compilation environment and the variation within the statement portion of the dynamic portion; and
   d) if any or all of said SQL statement text, compilation environment or variation are not located within said statement portion, then as required:
      i) creating a statement entry and adding it to the list of statement entries;
      ii) creating a compilation environment and adding it to the list of compilation environments under the appropriate statement entry; and
      iii) calling the SQL compiler to create a new variation and adding it to the list of variations under the appropriate compilation environment.

4. A node containing computer readable memory for storing instructions for use in the execution of the method of claim 1.

5. A medium encoded with executable program code to effect the method of claim 1.

6. A global cache for SQL sections in a relational database management system, said global cache being stored in a computer readable memory and being accessible to a plurality of agents, said cache comprising:
   a) a portion including a static SQL section; and
   b) a portion including a dynamic SQL section.

7. The global cache of claim 6 wherein said static SQL portion comprises:
   a) one or more packages; and
   b) one or more section entries within each of said packages.

8. The global cache of claim 1 wherein said dynamic SQL portion comprises:
   a) a statement portion; and
   b) a dependency portion.

9. The global cache of claim 8, wherein the static portion includes, in at least one package, a section including a section entry for a dynamic SQL request.

10. The global cache of claim 8, wherein said statement portion comprises:
   a) one or more SQL text statements;
   b) one or more compilation environments, each compilation environment being linked with one SQL text statement;
   c) at least one variation linked to each of said compilation environments.

11. The global cache of claim 10, wherein each variation includes an indication of the validity thereof.

12. The global cache of claim 11, wherein said dependency portion comprises a plurality of lists of objects, each of said lists being specific to a single object type, each object in each of said lists containing information on which of said variations are dependent on said object.

13. The global cache of claim 11 wherein said compilation environment comprises information not contained in the catalogue tables, said information being of a type that influences the decision made by an SQL compiler when generating an access plan.

14. A Relational Database Management system comprising a plurality of interlinked heterogeneous nodes, each of said nodes having associated storage and processor resources wherein each node includes:
   a) a global cache comprising a plurality of SQL sections;
   b) means for locating said sections; and
   c) means for creating new variations in said cache.

15. The system of claim 14, wherein said global cache comprises:
   a) a static SQL portion; and
   b) a dynamic SQL portion.

16. The system of claim 15 wherein said static portion comprises:
   a) one or more packages; and
   b) one or more section entries within each of said packages.

17. The system of claim 16, wherein the static portion includes, in one package, a section including a section entry for a dynamic SQL request.

18. The system of claim 17 wherein said dynamic portion comprises:
   a) a statement portion; and
   b) a dependency portion.

19. The system of claim 18, wherein said statement portion comprises:
   a) one or more SQL text statements;
   b) one or more compilation environments, each compilation environment being linked with one SQL text statement;
   c) at least one variation linked to each of said compilation environments.

20. The system of claim 19, wherein each variation includes an indication of the validity thereof.

21. The system of claim 20, wherein said dependency portion comprises a plurality of lists of objects, each of said lists being specific to a single object type, each object in each of said lists containing information on which of said variations are dependent on said object.

22. The system of claim 21 wherein said compilation environment comprises information not contained in the catalogue tables, said information being of a type that influences the decision made by an SQL compiler when generating an access plan.

* * * * *